(12) United States Patent
Chen et al.

(10) Patent No.: US 10,234,958 B2
(45) Date of Patent: *Mar. 19, 2019

(54) INPUT METHOD EDITORS FOR INDIC LANGUAGES

(71) Applicant: Google Inc., Mountain View, CA (US)

(72) Inventors: Ruiyi Chen, Beijing (CN); Fan Yang, Beijing (CN); Manish Bhargava, Los Altos, CA (US)

(73) Assignee: Google LLC, Mountain View, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 15/386,067

(22) Filed: Dec. 21, 2016

(65) Prior Publication Data

US 2017/0102780 A1  Apr. 13, 2017

Related U.S. Application Data

(63) Continuation of application No. 14/096,100, filed on Dec. 4, 2013, now Pat. No. 9,529,449.

(51) Int. Cl.
| | |
|---|---|
| *G06F 3/01* | (2006.01) |
| *G06F 3/0488* | (2013.01) |
| *G06F 17/22* | (2006.01) |
| *G06F 3/023* | (2006.01) |
| *G06F 3/0489* | (2013.01) |

(Continued)

(52) U.S. Cl.
CPC ............ *G06F 3/018* (2013.01); *G06F 3/0233* (2013.01); *G06F 3/0238* (2013.01); *G06F 3/0489* (2013.01); *G06F 3/04842* (2013.01); *G06F 3/04886* (2013.01); *G06F 17/2223* (2013.01); *G06F 17/273* (2013.01); *G06F 3/0219* (2013.01); *G06F 3/0236* (2013.01); *G06K 2209/013* (2013.01)

(58) Field of Classification Search
CPC .... G06F 3/018; G06F 3/04886; G06F 3/0236; G06F 3/0233; G06F 3/04883; G06F 3/0219; G06F 3/0489; G06F 17/2223; G06F 17/273

See application file for complete search history.

(56) References Cited

U.S. PATENT DOCUMENTS

| | | | | |
|---|---|---|---|---|
| 7,414,616 | B2 * | 8/2008 | Jayachandra | ........... G06F 3/018 345/168 |
| 7,721,222 | B1 * | 5/2010 | Shaik | ....................... G06F 3/018 345/156 |

(Continued)

*Primary Examiner* — Dismery Mercedes
(74) *Attorney, Agent, or Firm* — Dority & Manning, P.A.

(57) ABSTRACT

A first touch input can indicate a selection of a character from a first virtual keyboard configured for an Indic script. A modified first virtual keyboard can be displayed in response to the first touch input when the selected character is a consonant, the modified first virtual keyboard including diacritic forms of vowels from the first virtual keyboard. A second virtual keyboard can be displayed in response to the first touch input when the selected character is a vowel and a duration of the first touch input is greater than or equal to a predetermined duration, the second virtual keyboard including at least one of (i) diacritic forms of the selected character and (ii) vowels having similar sounds as the selected character. A second touch input can indicate a selection of (i) a vowel from the modified first virtual keyboard or (ii) a vowel from the second virtual keyboard.

20 Claims, 4 Drawing Sheets

(51) Int. Cl.
*G06F 17/27* (2006.01)
*G06F 3/0484* (2013.01)
*G06F 3/02* (2006.01)

(56) References Cited

U.S. PATENT DOCUMENTS

| | | | |
|---|---|---|---|
| 8,207,943 B2* | 6/2012 | Park | G06F 3/04886 345/171 |
| 8,253,694 B2* | 8/2012 | Raghunath | G06F 3/04886 345/156 |
| 8,286,104 B1 | 10/2012 | Yonge-Mallo | |
| 8,508,483 B2 | 8/2013 | Park | |
| 8,581,851 B2* | 11/2013 | Pienimaa | G06F 3/018 345/168 |
| 8,593,406 B2 | 11/2013 | Longe | |
| 8,806,362 B2 | 8/2014 | Ording | |
| 2007/0156394 A1* | 7/2007 | Banerjee | G06F 3/018 704/10 |
| 2007/0174771 A1 | 7/2007 | Mistry | |
| 2008/0300861 A1 | 12/2008 | Emam | |
| 2009/0058823 A1 | 3/2009 | Kocienda | |
| 2009/0225034 A1 | 9/2009 | Kida et al. | |
| 2009/0225041 A1 | 9/2009 | Kida et al. | |
| 2009/0262082 A1 | 10/2009 | Park | |
| 2009/0265669 A1* | 10/2009 | Kida | G06F 3/0234 715/863 |
| 2010/0188338 A1 | 7/2010 | Longe | |
| 2010/0231523 A1* | 9/2010 | Chou | G06F 3/018 345/171 |
| 2010/0262418 A1* | 10/2010 | Musa | G06F 17/2223 704/2 |
| 2011/0022956 A1 | 1/2011 | Sung | |
| 2011/0054882 A1* | 3/2011 | Bhalerao | G06F 17/2705 704/9 |
| 2011/0242138 A1 | 10/2011 | Tribble | |
| 2012/0019537 A1 | 1/2012 | Caine | |
| 2012/0056815 A1* | 3/2012 | Mehra | G06F 3/018 345/169 |
| 2012/0311439 A1 | 12/2012 | Yang et al. | |
| 2013/0050098 A1* | 2/2013 | Ide | G06F 3/04886 345/173 |
| 2013/0127728 A1* | 5/2013 | Park | G06F 3/017 345/168 |
| 2014/0043239 A1* | 2/2014 | Agrawal | G06F 3/04886 345/169 |
| 2015/0067575 A1* | 3/2015 | Pani | G06F 3/04886 715/773 |

* cited by examiner

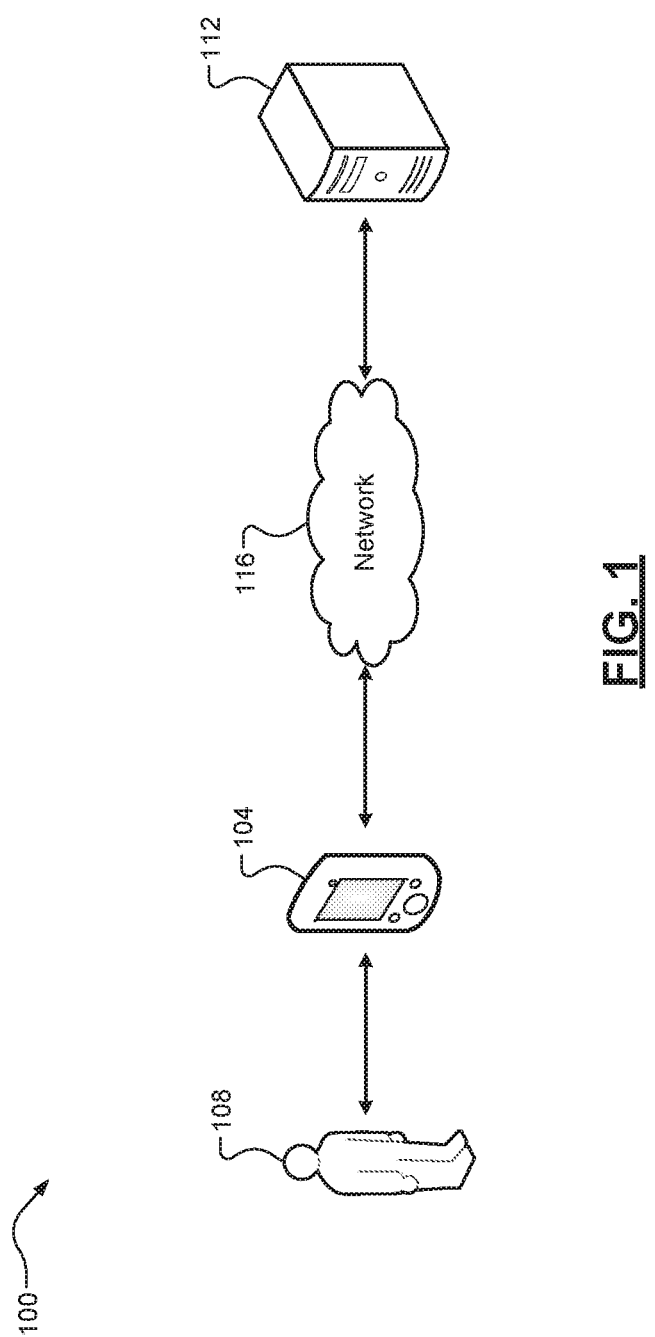

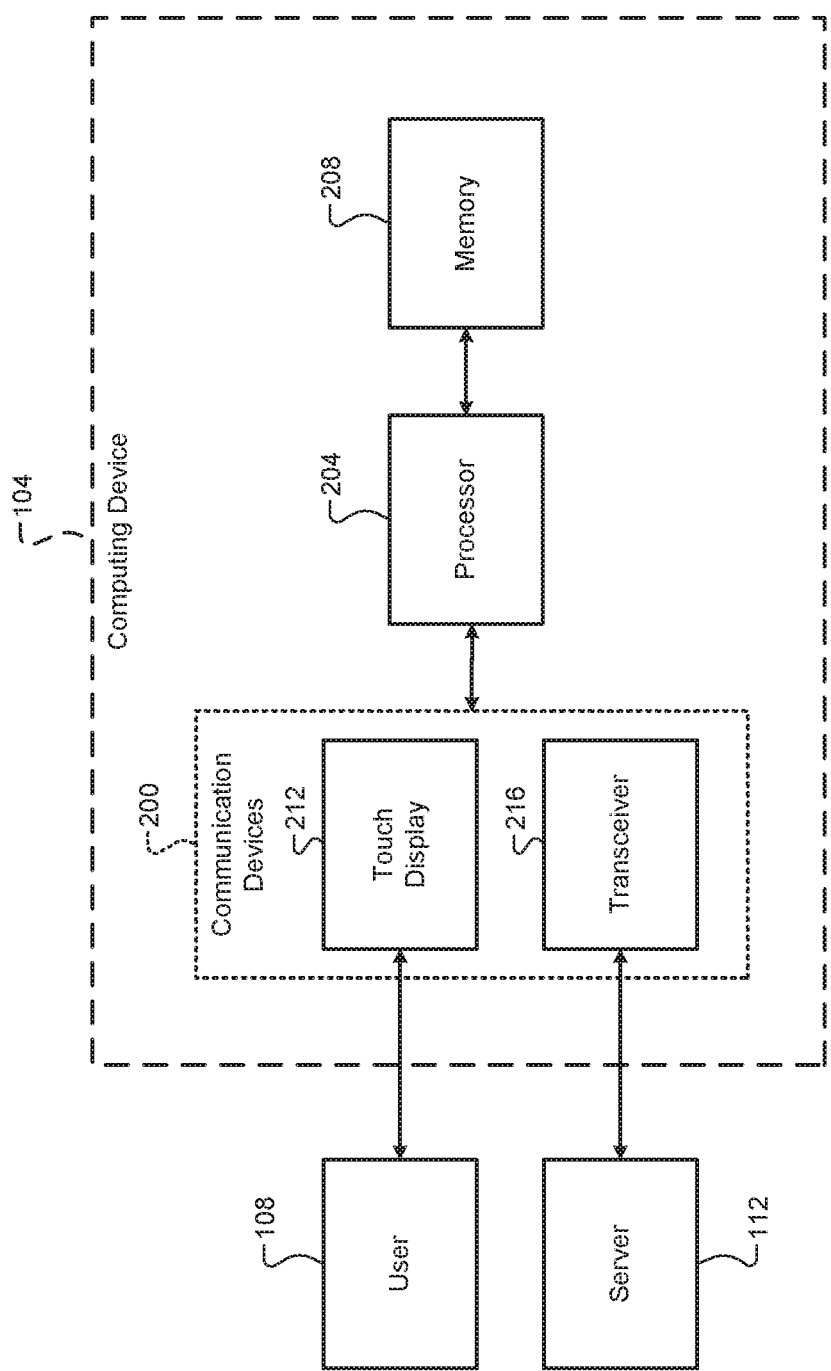

INPUT METHOD EDITORS FOR INDIC LANGUAGES

CROSS-REFERENCE TO RELATED APPLICATIONS

This application is a continuation of U.S. patent application Ser. No. 14/096,100, filed Dec. 4, 2013. The disclosure of the above application is incorporated herein by reference in its entirety.

FIELD

The present disclosure relates generally to computing devices and, more particularly, to input method editors for Indic languages.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A user can provide touch input to a computing device (a tablet computer, a mobile phone, etc.) via a virtual keyboard displayed on a touch display of the computing device. For example, the user may input a string of characters by selecting a sequence of keys of the virtual keyboard. Each virtual keyboard may be configured for a specific script. For example, an English virtual keyboard can be configured for the traditional Roman alphabet. Some languages, however, utilize scripts that include hundreds or thousands of unique characters. Virtual keyboards for these languages/scripts can be very complex and difficult for use, which can result in slow user input.

SUMMARY

A computer-implemented method is presented. The method can include displaying, at a computing device having one or more processors, a first virtual keyboard configured for an Indic script via a touch display of the computing device. The method can include receiving, at the computing device, a first touch input from a user indicating a selection of a character from the first virtual keyboard to obtain a selected character. The method can include displaying, at the computing device, a modified first virtual keyboard in response to the first touch input when the selected character is a consonant, the modified first virtual keyboard including diacritic forms of vowels from the first virtual keyboard. The method can include displaying, at the computing device, a second virtual keyboard in response to the first touch input when the selected character is a vowel and a duration of the first touch input is greater than or equal to a predetermined duration, the second virtual keyboard including at least one of (i) diacritic forms of the selected character and (ii) vowels having similar sounds as the selected character. The method can also include receiving, at the computing device, a second touch input from the user indicating a selection of (i) a vowel from the modified first virtual keyboard or (ii) a vowel from the second virtual keyboard.

In some embodiments, the diacritic forms of the vowels from the first virtual keyboard and the diacritic forms of the selected character are based on a context of at least one of (i) the selected character and (ii) one or more previously selected characters.

In other embodiments, the predetermined duration is an appropriate amount of time for determining that the user is intending to input a diacritic form of the selected character.

In some embodiments, consonant keys of the first virtual keyboard are arranged in alphabetical order.

In other embodiments, a top row of character keys of the first virtual keyboard comprises the consonant keys, and a bottom row of character keys of the first virtual keyboard comprises vowel keys.

In some embodiments, the first virtual keyboard comprises three rows of character keys, a top two of the three rows of character keys comprising the consonant keys, and a bottom of the three rows of character keys comprising the vowel keys.

In other embodiments, the first virtual keyboard includes two pages and is configured to switch between the two pages in response to a selection of an actuation key by the user, each page including at least a portion of at least one of (i) the character keys and (ii) the vowel keys.

In some embodiments, the second virtual keyboard is a pop-up keyboard overlaying at least a portion of the first virtual keyboard.

In other embodiments, the second virtual keyboard replaces the first virtual keyboard.

In some embodiments, the Indic script is Devanagari.

A computing device is also presented. The computing device can include a touch display and one or more processors. The touch display can be configured to receive touch input from a user and to display at least one of a first virtual keyboard, a modified first virtual keyboard, and a second virtual keyboard. The one or more processors can be configured to output the first virtual keyboard to the touch display, the first virtual keyboard being configured for an Indic script. The one or more processors can be configured to receive a first touch input from the user via the touch display indicating a selection of a character from the first virtual keyboard to obtain a selected character. The one or more processors can be configured to output the modified first virtual keyboard to the touch display in response to the first touch input when the selected character is a consonant, the modified first virtual keyboard including diacritic forms of vowels from the first virtual keyboard. The one or more processors can be configured to output the second virtual keyboard to the touch display in response to the first touch input when the selected character is a vowel and a duration of the first touch input is greater than or equal to a predetermined duration, the second virtual keyboard including at least one of (i) diacritic forms of the selected character and (ii) vowels having similar sounds as the selected character. The one or more processors can also be configured to receive a second touch input from the user via the touch display indicating a selection of (i) a vowel from the modified first virtual keyboard or (ii) a vowel from the second virtual keyboard.

In some embodiments, the diacritic forms of the vowels from the first virtual keyboard and the diacritic forms of the selected character are based on a context of at least one of (i) the selected character and (ii) one or more previously selected characters.

In other embodiments, the predetermined duration is an appropriate amount of time for determining that the user is intending to input a diacritic form of the selected character.

In some embodiments, consonant keys of the first virtual keyboard are arranged in alphabetical order.

In other embodiments, a top row of character keys of the first virtual keyboard comprises the consonant keys, and a bottom row of character keys of the first virtual keyboard comprises vowel keys.

In some embodiments, the first virtual keyboard comprises three rows of character keys, a top two of the three rows of character keys comprising the consonant keys, and a bottom of the three rows of character keys comprising the vowel keys.

In other embodiments, the first virtual keyboard includes two pages and is configured to switch between the two pages in response to a selection of an actuation key by the user, each page including at least a portion of at least one of (i) the character keys and (ii) the vowel keys.

In some embodiments, the second virtual keyboard is a pop-up keyboard overlaying at least a portion of the first virtual keyboard.

In other embodiments, the second virtual keyboard replaces the first virtual keyboard.

In some embodiments, the Indic script is Devanagari.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a diagram of an example computing system according to some implementations of the present disclosure;

FIG. 2 is a functional block diagram of the example computing system of FIG. 1;

DETAILED DESCRIPTION

Figure 3A:
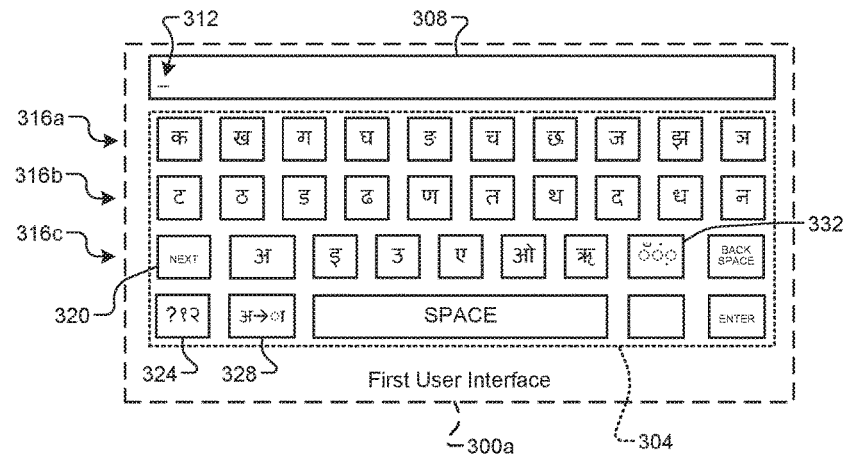
FIGS. 3A-3C are diagrams of user interfaces having example virtual keyboards according to some implementations of the present disclosure.

Indic (Indian) languages can utilize Brahmic scripts, which are a family of Abugida writing systems. Abugida writing systems (also known as alphasyllabary writing systems) are segmental writing systems in which consonant-vowel sequences are written as a unit. Each unit is based on the consonant character, and the vowel character (or vowel notation) is secondary. A Brahmic script can include hundreds or thousands of unique characters. These unique characters can include consonants, vowels, and various diacritic forms of the vowels. One example of a Brahmic script is Devanagari, which includes 33 consonants, 12 vowels, and many other diacritic forms of its vowels.

Due to the large number of unique characters, an Indic virtual keyboard may display two or more characters for each key, and the user may be required to actuate another key, e.g., Shift, in order to select one of the two or more characters associated with a specific key. Similarly, the user may be required to actuate another key in order to switch between vowels and diacritic forms of the vowels. Alternatively, an Indic virtual keyboard may include a plurality of different layouts across different pages, which can be time consuming for the user to search through.

Accordingly, input method editors (IMEs) for Indic languages are presented. The term "Indic script" as used herein refers to a script for an Indic language. One example Indic script is the Brahmic script Devanagari. These IMEs can provide for faster user input, which can result in an improved user experience. A first virtual keyboard configured for an Indic script may separate consonants and vowels into different areas, e.g., different rows, for easier searching by a user. One example configuration is the top two rows being used for consonants and a bottom row being used for vowels. The first virtual keyboard may also order its characters alphabetically for easier searching by the user. In some implementations, the first virtual keyboard may have a plurality of pages, which can be accessed using an actuation key, e.g., Shift. One example configuration has the three rows in each page, and two total pages.

A first touch input from the user can be received via the first virtual keyboard. The first touch input can indicate a selection of a character. The IME can behave differently depending on whether the selected character is a consonant or a vowel. When the selected character is a vowel and the duration of the first touch input is greater than or equal to a predetermined duration (a long press), the second virtual keyboard can be output. This second virtual keyboard can replace or overlay the first virtual keyboard. One example of the second virtual keyboard is a pop-up window that overlays the first virtual keyboard. The second virtual keyboard can include at least one of: (i) diacritic forms of the selected character, and (ii) related vowels having similar sounds as the selected character.

When the selected character is a vowel and the duration of the first touch input is less than the predetermined duration (a short press), the IME can utilize the vowel indicated by the selection and continue receiving input via the first virtual keyboard without modification/interruption. When the selected character is a consonant, however, the IME can change its vowels to their diacritic forms based on the context of previous inputs. This altered keyboard can be referred to as a modified first virtual keyboard. The previous inputs used for determining the context can include at least one of: (i) the selected character, and (ii) previously selected characters. The IME can then receive a second touch input from the user indicating a selection of (i) a vowel from the modified first virtual keyboard and (ii) a vowel from the second virtual keyboard.

Referring now to FIG. 1, an example computing system 100 is illustrated. The computing system 100 can include a touch computing device 104 (hereinafter "computing device 104"). The computing device 104 can be any suitable computing device for displaying a virtual keyboard and receiving input from a user 108 via the virtual keyboard (a desktop computer, a laptop computer, a tablet computer, a mobile phone, etc.). The computing device 104 can also communicate with a server 112 via a network 116. The server 112 can be any suitable computing device configured to communicate with the computing device 104 via the network 116. It should be appreciated that the term "server" as used herein can refer to both a single server and two or more servers operating in a parallel or distributed architecture. The network 116 can be a local area network (LAN), a wide area network (WAN), e.g., the Internet, or a combination thereof. One example use of the server 112 is to determine the context of an input string, in conjunction with the computing device 104, which can be used by the computing device 104 to determine diacritic forms of vowels. The computing device 104, however, can also determine the context of the input string on its own.

Referring now to FIG. 2, a functional block diagram of the example computing device 104 is illustrated. The computing device 104 can include one or more communication devices 200, a processor 204, and a memory 208. It should be appreciated that the term "processor" as used herein can refer to both a single processor and two or more processors operating in a parallel or distributed architecture. The memory 208 can be any suitable storage medium (flash, hard disk, etc.) configured to store information at the computing device 104.

The communication devices 200 can include any suitable devices for communicating with the computing device 104. For example, the communication devices 200 include a touch display 212 and a transceiver 216. The touch display 212 can be configured for communication between the user 108 and the computing device 104. The transceiver 216 can be configured for communication between the server 112 and the computing device 104, e.g., via the network 116.

The processor 204 can control operation of the computing device 104. Specifically, the processor 204 can control operations including, but not limited to, loading/executing an operating system of the computing device 104, processing information input via the touch display 212 and/or received via the transceiver 216, controlling information output via the touch display 212 and/or the transmitted via the transceiver 216, and/or controlling read/write operations at the memory 208. The processor 204 can also wholly or partially execute the techniques of the present disclosure, as is described in further detail below.

The processor 204 can output a first virtual keyboard via the touch display 212. This first virtual keyboard can be configured for an Indic script, e.g., Devanagari. The first virtual keyboard can include a plurality of rows of character keys including consonant keys and vowel keys. In some implementations, a top row of the plurality of rows of character keys can include consonant keys, and a bottom row of the plurality of rows of character keys can include vowel keys. In one implementation, the first virtual keyboard can include three rows of characters keys having the top two rows as consonant keys and the bottom row as vowel keys. Separating the consonant keys and the vowel keys into distinct areas can make it easier for the user 108 to find a desired key. Additionally, in some implementations the first virtual keyboard can have the consonant keys arranged in alphabetical order to make it easier for the user 108 to find the desired key. It should be appreciated that the first virtual keyboard can also include other keys and/or other rows of keys, such as function keys (space, enter, shift, etc.).

The processor 204 can receive a first touch input from the user 108 via the touch display 212. The first touch input can indicate a selection of a character key from the first virtual keyboard to obtain a selected character. When the selected character is a consonant, the processor 204 can output a modified first virtual keyboard via the touch display 212. The modified first virtual keyboard can be based generally on the first virtual keyboard, but can have the vowel keys, e.g., the bottom row of character keys, replaced with keys corresponding to diacritic forms of the vowels from the first virtual keyboard.

These diacritic forms of the vowels can be based on a context of the previously input characters: the selected character and/or one or more previously input characters. The term "context" as used herein can refer to a contextual meaning of the previously input character(s), which can affect the diacritic forms of the vowels. The user 1008 can then select one of the diacritic forms of the vowels. As previously mentioned, the server 112 can be used to at least partially determine the context of a character string. For example, the diacritic forms of the vowels may be different when based on the previous character. Additionally, for example, the diacritic forms of the vowels may be different when based on the previous two characters than when based on only the previous character.

When the selected character is a vowel, however, the processor 204 may output a second virtual keyboard depending on a temporal length of the first touch input. The second virtual keyboard can be configured such that the user 108 can input a diacritic form of the selected vowel. More specifically, when the selected character is a vowel and a duration of the first touch input is greater than or equal to a predetermined duration, the processor 204 can output a second virtual keyboard. Alternatively, when the second character is a vowel and the duration of the first touch input is less than the predetermined duration, the processor 204 can utilize the selected character (vowel) and continue receiving input via the first virtual keyboard. The predetermined duration can be an appropriate amount of time for determining that the user 108 is intending to input a diacritic form of the selected vowel, e.g., a few seconds. A first touch input having a duration greater than or equal to the predetermined duration can also be referred to as a "long press."

The processor 204 can output the second virtual keyboard via the touch display 212. The second virtual keyboard may be a pop-up window that at least partially overlays the first virtual keyboard. The second virtual keyboard can include at least one of: (i) diacritic forms of the selected vowel, and (ii) other vowels having a similar sound as the selected vowel. The diacritic forms of the selected vowel can also be based on a context of previously input character(s), which can affect the diacritic forms of the selected vowel. The number of diacritic forms of the selected vowel may be less than the total number of characters of the first virtual keyboard such that the second virtual keyboard may overlay only a portion of the first virtual keyboard. An example position of the layout of the second virtual keyboard is above the selected vowel or otherwise proximate to the selected vowel. In some implementations, the processor 204 can replace the first virtual keyboard with the second virtual keyboard. The processor 204 can then receive a second touch input from the user 108 indicating a selection of (i) a vowel from the modified first layout of characters, or (ii) a vowel from the second layout of characters, depending on the selected character and the first touch input duration.

Figure 3B:
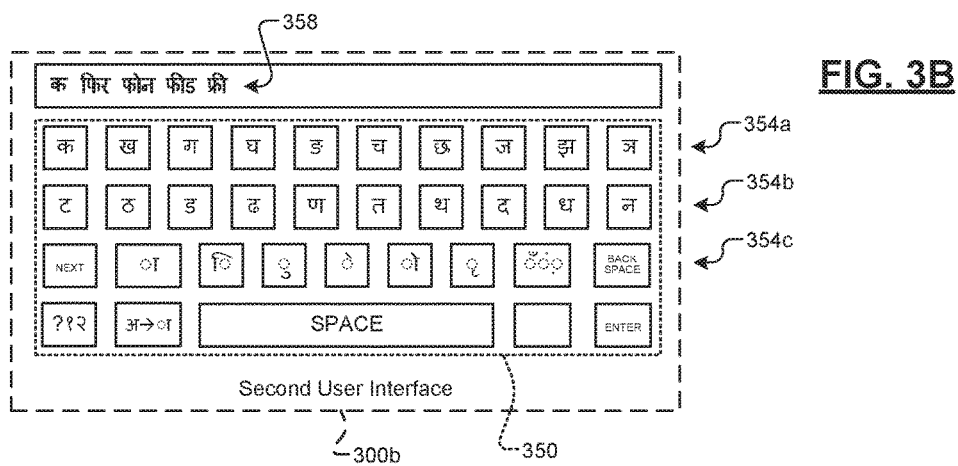
Figure 3C:
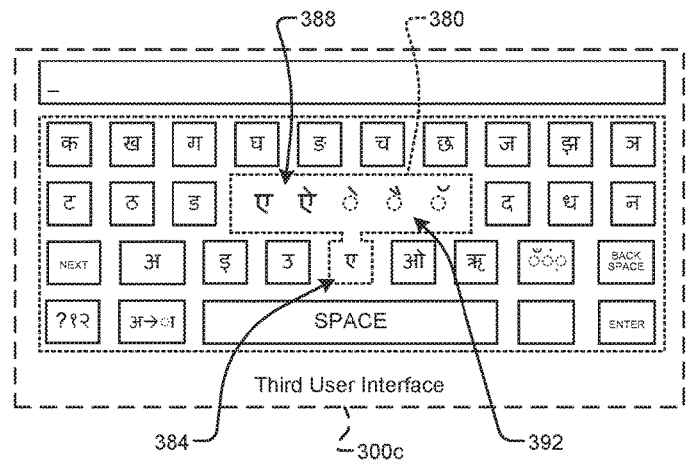

Referring now to FIGS. 3A-3C, user interfaces 300a, 300b, and 300c (collectively referred to as "user interfaces 300") are illustrated. The user interfaces 300 include example virtual keyboards according to some implementations of the present disclosure, which are described in greater detail below. The user interfaces 300 can be displayed at the touch display 212 of the computing device 104, and the user 108 can provide input with respect to the user interfaces 300 using the touch display 212 of the computing device 104.

FIG. 3A illustrates the first user interface 300a. The first user interface 300a includes a first virtual keyboard 304. In some implementations, first virtual keyboard 304 can be the first virtual keyboard discussed herein. The first user interface 300a can further include a character entry area 308 configured to display characters input to the computing device 104 The character entry area 308 can include a cursor 312 indicating a current position within a string of characters being input. The character entry area 308 can be located above the first virtual keyboard 304 as shown, or can be located at another suitable position, e.g., below the first virtual keyboard 304.

The first virtual keyboard 304 can include a plurality of characters keys. The term "character key" as used herein can refer to a key of a virtual keyboard, e.g., the first virtual keyboard 304, which corresponds to a character of a script, e.g., Devanagari. Character keys can be different than other keys of the virtual keyboards, e.g., function keys, which are discussed in greater detail below. The first virtual keyboard 304 can have three rows of character keys 316a, 316b, and 316c (collectively "rows of character keys 316"). The top two rows of character keys 316a and 316b can be consonant keys, and the bottom row of character keys 316c can be vowel keys. It should be appreciated that one or more of the rows of character keys 316 may include one or more other keys, e.g., the bottom row of character keys 316 includes both the vowel keys and a function key 320 labeled "NEXT."

The first virtual keyboard 304 may include a plurality of pages. Each page can include different character keys because there may be too many characters to fit in a single page of character keys. A function key 320 can be used to switch between the pages of character keys. While different pages of character keys may include different character keys, the general format of two rows of consonant keys 316a and 316b, one row of vowel keys 316c, and the function keys, e.g., function key 320, may remain the same for each page. For example, the first virtual keyboard 304 is configured for Devanagari script and includes two total pages of character keys. Other function keys can be used to control operation of the first virtual keyboard 304. A function key 324 can be used to input other characters, e.g., punctuation such as a question mark. Function keys 328 and 332 can be used to manually control diacritics. Other function keys (SPACE, BACKSPACE, ENTER) can be used to control the cursor, indentation, and other editing functions.

FIG. 3B illustrates the second user interface 300b. The second user interface 300b includes a modified first virtual keyboard 350. In some implementations, modified first virtual keyboard 350 can be the modified first virtual keyboard discussed herein. The modified first virtual keyboard 350 can be output when the selected character from the user 108 is a consonant. The modified first virtual keyboard 350 can also include three rows of character keys 354a, 354b, and 354c (collectively "rows of character keys 354"), but the bottom row of character keys 354c can include diacritic forms of the vowels from the first virtual keyboard 304. These diacritic forms of the vowels from the first virtual keyboard 304 can be based on a context of at least one of (i) the selected consonant and (ii) one or more previously selected/input characters. For example, a string of characters 358 can be used as the context for determining the diacritic forms for the vowels. The user 108 can then select one of the diacritic forms of the selected vowel from the modified first virtual keyboard 350.

FIG. 3C illustrates the third user interface 300c. The third user interface 300 includes a second virtual keyboard 380. In some implementations, the second virtual keyboard 380 can be the second virtual keyboard discussed herein. The second virtual keyboard 380 can be output when the first touch input from the user 108 indicates a selection 384 of a vowel that lasts longer than the predetermined duration (a long press). The second virtual keyboard 380 is output as a pop-up window above the selection 384, and overlays a portion of the first virtual keyboard 304. The second virtual keyboard 380 includes at least one of (i) diacritic forms of the selected vowel and (ii) other vowels having similar sounds as the selected vowel. As shown, the second virtual keyboard 380 includes two diacritic forms of the selected vowel (the two left-most vowels indicated by arrow 388) and three other vowels having similar sounds as the selected vowel (the three right-most vowels indicated by arrow 392). The user 108 can then select one of the vowels from the second virtual keyboard 380.

Figure 4:
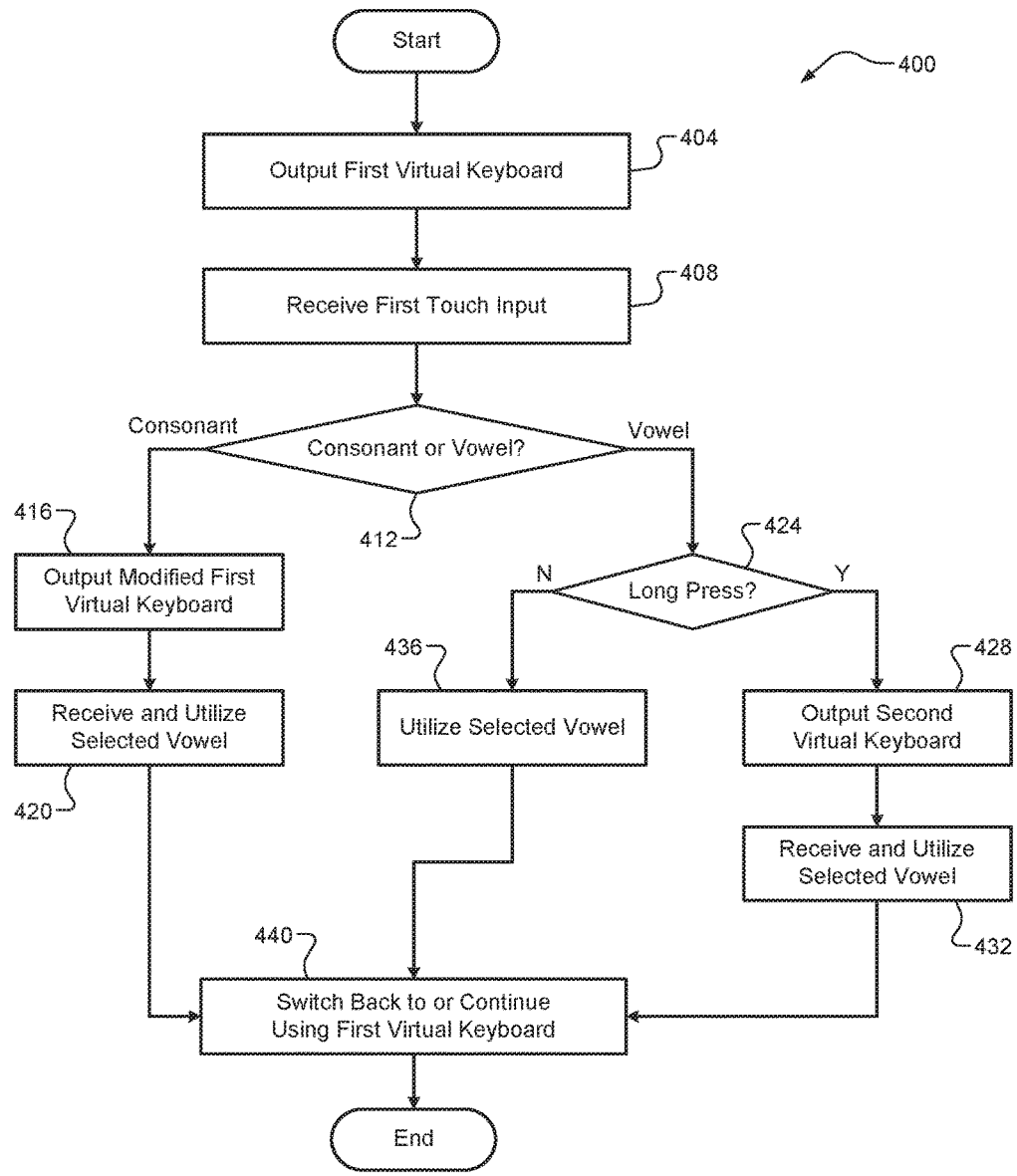
FIG. 4 is a flow diagram of an example technique for operating an Indic input method editor according to some implementations of the present disclosure.

Referring now to FIG. 4, an example technique 400 for operating an Indic IME is illustrated according to the principles of the present disclosure. At 404, the computing device 104 can output a first virtual keyboard configured for an Indic script via the touch display 212. An example of the first virtual keyboard is the first virtual keyboard 304. At 408, the computing device 104 can receive a first touch input from the user 108 indicating a selection of a character from the first virtual keyboard to obtain a selected character. At 412, the computing device 104 can determine whether the selected character is a consonant or a vowel. If the selected character is a consonant, the technique 400 can proceed to 416. If the selected character is a vowel, the technique can proceed to 424. At 416, the computing device 104 can output a modified first virtual keyboard including diacritic forms of the vowels from the first virtual keyboard. An example of the modified first virtual keyboard is the modified first virtual keyboard 350. At 420, the computing device 104 can receive a second touch input from the user 108 indicating a selection of a vowel from the modified first virtual keyboard. The computing device 104 can then utilize the selected vowel and switch back to the first virtual keyboard 304 at 440, and the technique 400 can end or return to 404 for one or more additional cycles.

At 424, the computing device 104 can determine whether a duration of the first touch input is greater than the predetermined duration (a long press). If the duration of the first touch input is greater than the predetermined duration, the technique can proceed to 428. Otherwise, the technique 400 can proceed to 436 where the computing device 104 can utilize the selected character (the selected vowel) and continue using the first virtual keyboard 304 at 440, and the technique 400 can then end or return to 404 for one or more additional cycles. At 428, the computing device 104 can output a second virtual keyboard including at least one of (i) diacritic forms of the selected character and (ii) vowels having similar sounds as the selected character. An example of the second virtual keyboard is the second virtual keyboard 380. At 432, the computing device 104 can receive a second touch input from the user 108 indicating a selection of a vowel from the second virtual keyboard. The computing device 104 can utilize the selected vowel and switch back to the first virtual keyboard 304 at 440, and the technique 400 can end or return to 404 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
    displaying, by a touch display of a computing device, a first virtual keyboard comprising a plurality of characters in a particular script, the plurality of characters comprising consonants and vowels;
    receiving, by the touch display, a first touch input indicating a selection of one of a plurality of characters to obtain a selected character from the first virtual keyboard; and
    when the selected character is a consonant, displaying, by the touch display and instead of the first virtual keyboard, a modified first virtual keyboard comprising diacritic forms of vowels from the first virtual keyboard,
    wherein the diacritic forms of the vowels (i) are different than the vowels from the first virtual keyboard, (ii) were not part of the first virtual keyboard, and (iii) replace at least some of the plurality of characters of the first virtual keyboard such that the diacritic forms of the vowels are part of the modified first virtual keyboard.

2. The computer-implemented method of claim 1, further comprising:
    displaying, by the touch display, the selected character; and
    receiving, by the touch display, a second touch input indicating a selection of and causing the displaying of a diacritic form of a vowel from the modified first virtual keyboard.

3. The computer-implemented method of claim 1, further comprising when the selected character is a vowel and a duration of the first touch input is greater than or equal to a predetermined duration, displaying, by the touch display, a second virtual keyboard comprising at least one of (i) diacritic forms of the selected character and (ii) vowels having similar sounds as the selected character.

4. The computer-implemented method of claim 3, further comprising receiving, by the touch display, a second touch input indicating a selection of and causing the displaying of a diacritic form of the vowel from the second virtual keyboard.

5. The computer-implemented method of claim 3, wherein the diacritic forms of the vowels from the first virtual keyboard and the diacritic forms of the selected character are each based on a context of both (i) the selected character and (ii) one or more previously selected characters.

6. The computer-implemented method of claim 1, further comprising when the selected character is a vowel and a duration of the first touch input is less than the predetermined duration, displaying, by the touch display, the selected character.

7. The computer-implemented method of claim 1, wherein the particular script is an Indic script.

8. A computing device, comprising:
    a touch display;
    a memory storing a set of instructions; and
    one or more processors configured to execute the set of instructions, which causes the computing device to perform operations comprising:
        displaying, by the touch display, a first virtual keyboard comprising a plurality of characters in a particular script, the plurality of characters comprising consonants and vowels;
        receiving, by the touch display, a first touch input indicating a selection of one of a plurality of characters to obtain a selected character from the first virtual keyboard; and
        when the selected character is a consonant, displaying, by the touch display and instead of the first virtual keyboard, a modified first virtual keyboard comprising diacritic forms of vowels from the first virtual keyboard,
        wherein the diacritic forms of the vowels (i) are different than the vowels from the first virtual keyboard, (ii) were not part of the first virtual keyboard, and (iii) replace at least some of the plurality of characters of the first virtual keyboard such that the diacritic forms of the vowels are part of the modified first virtual keyboard.

9. The computing device of claim 8, wherein the operations further comprise:
    displaying, by the touch display, the selected character; and
    receiving, by the touch display, a second touch input indicating a selection of and causing the displaying of a diacritic form of a vowel from the modified first virtual keyboard.

10. The computing device of claim 8, wherein the operations further comprise when the selected character is a vowel and a duration of the first touch input is greater than or equal to a predetermined duration, displaying, by the touch display, a second virtual keyboard comprising at least one of (i) diacritic forms of the selected character and (ii) vowels having similar sounds as the selected character.

11. The computing device of claim 10, wherein the operations further comprise receiving, by the touch display, a second touch input indicating a selection of and causing the displaying of a diacritic form of the vowel from the second virtual keyboard.

12. The computing device of claim 10, wherein the diacritic forms of the vowels from the first virtual keyboard and the diacritic forms of the selected character are each based on a context of both (i) the selected character and (ii) one or more previously selected characters.

13. The computing device of claim 8, wherein the operations further comprise when the selected character is a vowel and a duration of the first touch input is less than the predetermined duration, displaying, by the touch display, the selected character.

14. The computing device of claim 8, wherein the particular script is an Indic script.

15. A non-transitory, computer-readable medium having a set of instructions stored thereon that, when executed by one or more processors of a computing device, causes the computing device to perform operations comprising:
    displaying, by a touch display of the computing device, a first virtual keyboard comprising a plurality of characters in a particular script, the plurality of characters comprising consonants and vowels;
    receiving, by the touch display, a first touch input indicating a selection of one of a plurality of characters to obtain a selected character from the first virtual keyboard; and
    when the selected character is a consonant, displaying, by the touch display and instead of the first virtual keyboard, a modified first virtual keyboard comprising diacritic forms of vowels from the first virtual keyboard,
    wherein the diacritic forms of the vowels (i) are different than the vowels from the first virtual keyboard, (ii) were not part of the first virtual keyboard, and (iii)

replace at least some of the plurality of characters of the first virtual keyboard such that the diacritic forms of the vowels are part of the modified first virtual keyboard.

16. The computer-readable medium of claim 15, wherein the operations further comprise:

displaying, by the touch display, the selected character; and receiving, by the touch display, a second touch input indicating a selection of and causing the displaying of a diacritic form of a vowel from the modified first virtual keyboard.

17. The computer-readable medium of claim 15, wherein the operations further comprise when the selected character is a vowel and a duration of the first touch input is greater than or equal to a predetermined duration, displaying, by the touch display, a second virtual keyboard comprising at least one of (i) diacritic forms of the selected character and (ii) vowels having similar sounds as the selected character.

18. The computer-readable medium of claim 17, wherein the operations further comprise receiving, by the touch display, a second touch input indicating a selection of and causing the displaying of a diacritic form of the vowel from the second virtual keyboard.

19. The computer-readable medium of claim 15, wherein the operations further comprise when the selected character is a vowel and a duration of the first touch input is less than the predetermined duration, displaying, by the touch display, the selected character.

20. The computer-readable medium of claim 15, wherein the particular script is an Indic script.

* * * * *